J. IVES.

Lamp.

No. 8,579. Reissued Feb. 11, 1879.

Witnesses,
Chandler Hall.
Thomas E. Birch.

Inventor:
James Ives.
by his attorney.
Edwin H. Brown

N. PETERS, PHOTO-LITHOGRAPHER, WASHINGTON, D. C.

UNITED STATES PATENT OFFICE.

JAMES IVES, OF MOUNT CARMEL, CONNECTICUT.

IMPROVEMENT IN LAMPS.

Specification forming part of Letters Patent No. 46,471, dated February 21, 1865; Reissue No. 8,579, dated February 11, 1879; application filed September 19, 1878.

*To all whom it may concern:*

Be it known that I, JAMES IVES, of Mount Carmel, in the county of New Haven and State of Connecticut, have invented certain new and useful Improvements in Lamp-Burners, of which the following is a specification:

Some of these improvements consist in a lamp comprising the combination, with a cone and deflector and a wick-tube capable, with appurtenances, of being depressed vertically without tilting, of means for causing it to automatically return to a position for use.

Other improvements consist in the combination of a lamp, a shade-holder, and, preferably, also a chimney and deflector-holder connected therewith, so that one is adapted to be depressed and the other raised simultaneously, whereby, when the lamp is depressed to afford access to the wick, the shade, or the shade, chimney, and deflector, may be simultaneously moved away from it, and, preferably, so that the slightly superior weight of the shade, or shade and chimney, serves as a means for bringing the parts back to their proper position for use after the lamp has been filled, trimmed, cleaned, or lighted, as may have been requisite. These improvements afford double the amount of space between the lamp and shade, or shade and chimney, with half the length of movement usually made in the lamp, or in parts above it, and the shade or globe itself answers as a weight to bring the parts together, thus dispensing with weights and cords, which impair the beauty of the arrangement.

Other improvements consist in the means shown for accomplishing the suspension of a lamp and chimney, shade, and deflector, whereby stability, cheapness, and a perfect operation are obtained.

Other improvements consist in the combination of a ring for sustaining a lamp-reservoir and a pin extending above a projection on said reservoir to retain it in place, whereby provision is afforded for removing the reservoir from above.

The accompanying drawings illustrate the improvements embodied in a hanging lamp.

Figure 1:
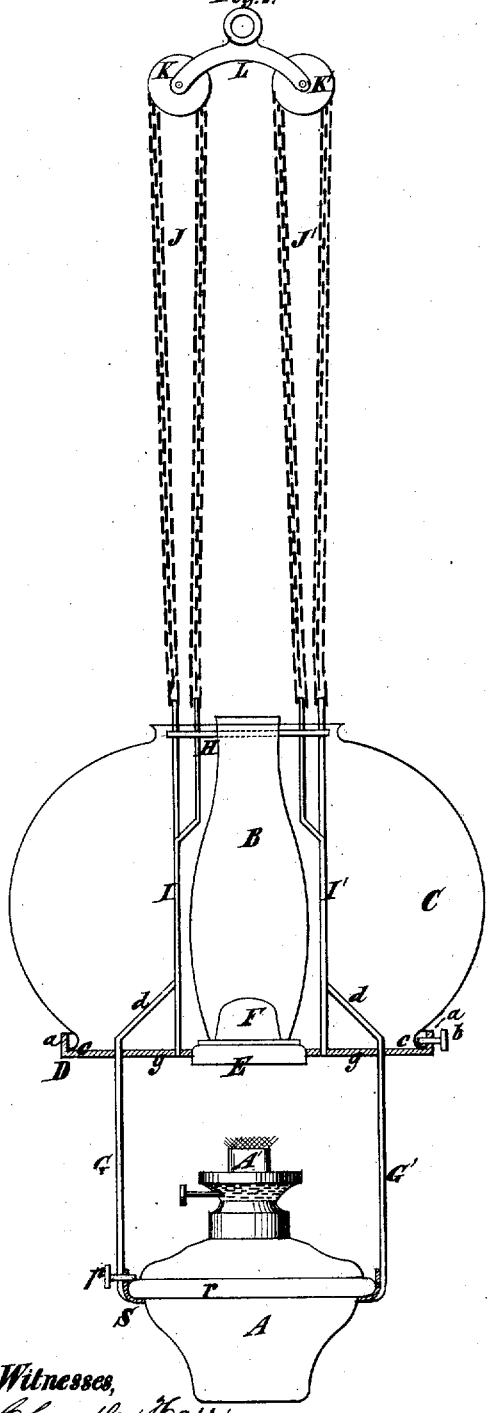
Figure 2:
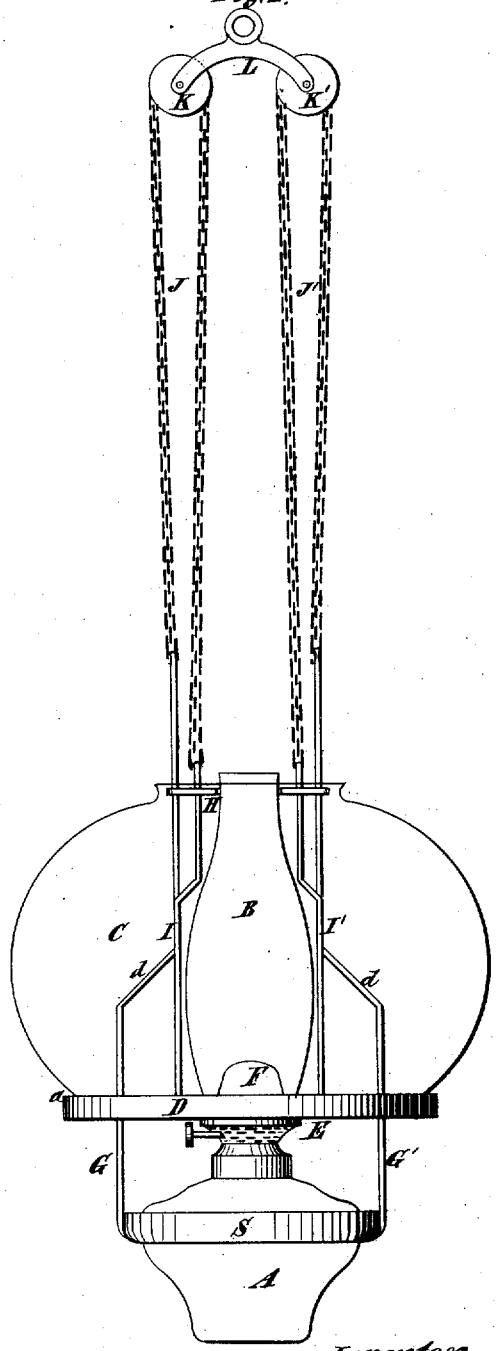

Figure 1 is a side elevation and partial section of such lamp with the parts adjusted for lighting or trimming the wick, or for extinguishing; and Fig. 2 is a side elevation of the same with the parts adjusted for use.

Similar letters of reference designate corresponding parts in both figures.

A designates a lamp-reservoir for supplying illuminating material to a burner provided with a wick-tube, A′; B, a chimney; C, a shade, and F a deflector, which may be of any ordinary formation. The reservoir is shown as supported in a socket or holder provided with means for impinging on the reservoir to retain it in place, and yet provide for removing the reservoir from above the ring, when desirable, to remove it.

In this example of my invention an annular or ring-shaped socket, S, is employed, and is provided with a pin, *p*, projecting inward, and impinging upon the reservoir above a rim or bead, *r*, on the said reservoir. The holder for the shade is capable of being moved away from the wick-tube A′ to afford facility for access to the wick, and, as represented, it is provided with means for retaining the shade in place, consisting of an upwardly-extending device, *a*, and an inwardly-extending device for grasping the same, shown as consisting of a pin, *b*, which projects over a flange or lip, *c*, on the shade, thereby enabling the shade to be moved away from the wick-tube by moving the holder, and without touching the shade. Therefore it may be moved away from the wick-tube without any danger of dropping or any liability of smearing or otherwise soiling it.

As represented, the shade-holder is also combined with a chimney and deflector-holder, E, wherefore not only may the shade be moved away from the wick-tubes with the advantage just enumerated, but provision is afforded for likewise and simultaneously moving the chimney and deflector. Thus all may be moved away with one hand, leaving the other free for trimming, lighting, or otherwise attending to the lamp. The shade and chimney and deflector-holders D E are connected by narrow cross bars or arms *g g*, so that no great amount of obstruction to the downward reflection of the light shall be offered. The holder E is also open at the bottom, so as to admit the wick-tube of the lamp up into the deflector, as usual. G G′ are rods, which, in this example of my invention, extend up from the lamp through the holder D, and up to and through a semicircular guard and stay-plate, H. At *d d* these rods are bent so as to form a stop for controlling the downward movement of the lamp. I I′ are other rods extending up from the holder D, and fastening firmly to the stay-plate or collar H. The ends of these rods G and I are shown as connected by an endless chain, J, passing up over a pulley, K, of a suspension-bracket or bow, L. A similar chain, J′, is shown as extending up from the rods G′ I′ and over a pulley, K′, on the other end of the bow L.

When the chimney is set in its holder the stay-plate H partly encircles it, and thus lessens the liability of the chimney falling or being knocked out of place. It will be seen that provision is thus afforded for depressing or drawing down the wick-tube and appurtenances vertically without tilting, to afford access to the wick for lighting, trimming, or extinguishing the lamp; that the shade may also be simultaneously moved away from the wick-tube; that the chimney and deflector may likewise be so moved away from it, the weight of the shade and chimney serving as a means for causing the wick-tube and appurtenances to automatically resume a position for use after they have been depressed or drawn down by hand, or at least may greatly facilitate the same, and that the means for effecting this result acts upon the wick-tube through the body of the burner, or, in other words, that the force of the means for returning the wick-tube is imparted to the wick-tube through the body of the burner.

It is a novelty among lamp manufacturers and in the arts, I believe, to provide for the depression of the wick-tube and appurtenances vertically without tilting and their automatic return to the normal position, to provide for raising a shade and depressing a lamp simultaneously, and to provide for the shade-holder and the shade, chimney, and deflector-holders going up or standing still together while the lamp is drawn down or away from them.

What I claim as my invention, and desire to secure by Letters Patent, is—

1. A lamp comprising the combination, with a cone and deflector and a wick-tube capable, with appurtenances, of being depressed vertically without tilting, of means for causing it to automatically return to a position for use.

2. A lamp comprising the combination, with a cone and deflector and a wick-tube capable, with appurtenances, of being depressed vertically without tilting, of means acting on said wick-tube through the body of the burner for causing it to automatically return to a position for use.

3. A lamp comprising the combination, with a cone and deflector and a wick-tube capable, with appurtenances, of being depressed vertically without tilting, of a counterbalancing-weight for causing it to return to a position for use after having been depressed.

4. A lamp comprising the combination, with a cone and deflector and a wick-tube capable, with appurtenances, of being depressed vertically without tilting, of means for causing it to automatically return to a position for use, and guides for the wick-tube during its movements.

5. A lamp comprising the combination, with a cone and deflector and a wick-tube capable, with appurtenances, of being depressed vertically without tilting, and means for causing it to automatically return to a position for use, of guides for the wick-tube during its movements, provided with stops for preventing the wick-tube from being depressed too far.

6. The combination of a lamp and a shade-holder connected therewith, so that one is adapted to be depressed and the other raised simultaneously.

7. The combination of a lamp and a shade and chimney-holder connected therewith, so that when the lamp is depressed the shade and chimney-holder will be raised.

8. The combination of a lamp and shade therefor capable of being separated to afford access to the lamp, and connected by suspending-chains or equivalent devices, substantially as specified.

9. The combination, with a lamp and shade therefor capable of being separated to afford access to the lamp, and connected by suspending-chains or equivalent devices, of guides for the shade in its movements, substantially as specified.

10. The combination of a lamp and chimney capable of being separated to afford access to the lamp, and connected by suspending-chains or equivalent devices, substantially as specified.

11. The combination of a lamp and deflector therefor capable of being separated, to afford access to the lamp, and connected by suspending-chains or equivalent devices, substantially as specified.

12. The combination of a lamp, a shade, chimney, and deflector therefor capable of being separated to afford access to the lamp, and connected by suspending-chains or equivalent devices, substantially as specified.

13. The combination of a ring for sustaining a lamp-reservoir and a pin extending above a projection on said reservoir to retain it in place, whereby provision is afforded for removing the reservoir from above, substantially as specified.

14. The combination of the rods G G′ and I I′ with the stay and guard-plate H, base D, and lamp-reservoir, with its appurtenances, and chains J J′.

JAMES IVES.

Witnesses:
W. W. WOODRUFF,
A. H. WOODRUFF.